United States Patent [19]

Holet et al.

[11] 4,069,545
[45] Jan. 24, 1978

[54] DOOR CONTROL DEVICE WITH CLOSURE REGULATOR

[75] Inventors: Kenneth M. Holet, Waukesha, Wis.; Luis E. Prada, Louisville, Ky.

[73] Assignee: General Electric Company, Louisville, Ky.

[21] Appl. No.: 734,958

[22] Filed: Oct. 22, 1976

Related U.S. Application Data

[63] Continuation of Ser. No. 644,329, Dec. 24, 1975, abandoned.

[51] Int. Cl.² ............................................. E05F 3/00
[52] U.S. Cl. .................................................. 16/49; 16/52; 16/78; 16/72; 188/268; 188/291
[58] Field of Search ................. 16/49, 51, 52, 84, 82, 16/72, 78; 292/341.12; 188/297, 291, 268

[56] References Cited

U.S. PATENT DOCUMENTS

| | | | |
|---|---|---|---|
| 2,959,981 | 11/1960 | Hedbom | 188/268 |
| 3,118,167 | 1/1964 | Morris et al. | 188/268 X |
| 3,548,444 | 12/1970 | Jacobus et al. | 16/78 |
| 3,871,496 | 3/1975 | Wigal | 188/268 |

OTHER PUBLICATIONS

General Electric "Technical Data Manual", Pub. No. 30-85P-11, July 1970.

*Primary Examiner*—Ronald Feldbaum
*Attorney, Agent, or Firm*—Steven C. Schnedler; Francis H. Boos

[57] ABSTRACT

A device for controlling the opening and closing movement of a duct seal door of an automatic ice maker which requires a regulator for slowing down the closing of the door. The movement of the door about its rotational axis is transmitted via connecting linkages to the closure regulator which comprises a rotor positioned within a stator housing. The rotor's movement is coupled to the connecting linkages via a one-way clutch which decouples the rotor when the door is being opened, and causes positive coupling therebetween when the door is being closed. Disposed within the stator housing in a fixed-volume compartment is a viscous fluid, such as silicone gum. The rotor and stator include opposed rippled surfaces between which the viscous fluid is coactively disposed. The fluid acts as an impedance to the motion of the rotor, which motion occurs only upon the closing of the door, to thereby provide a controlled slow closure thereof.

13 Claims, 6 Drawing Figures

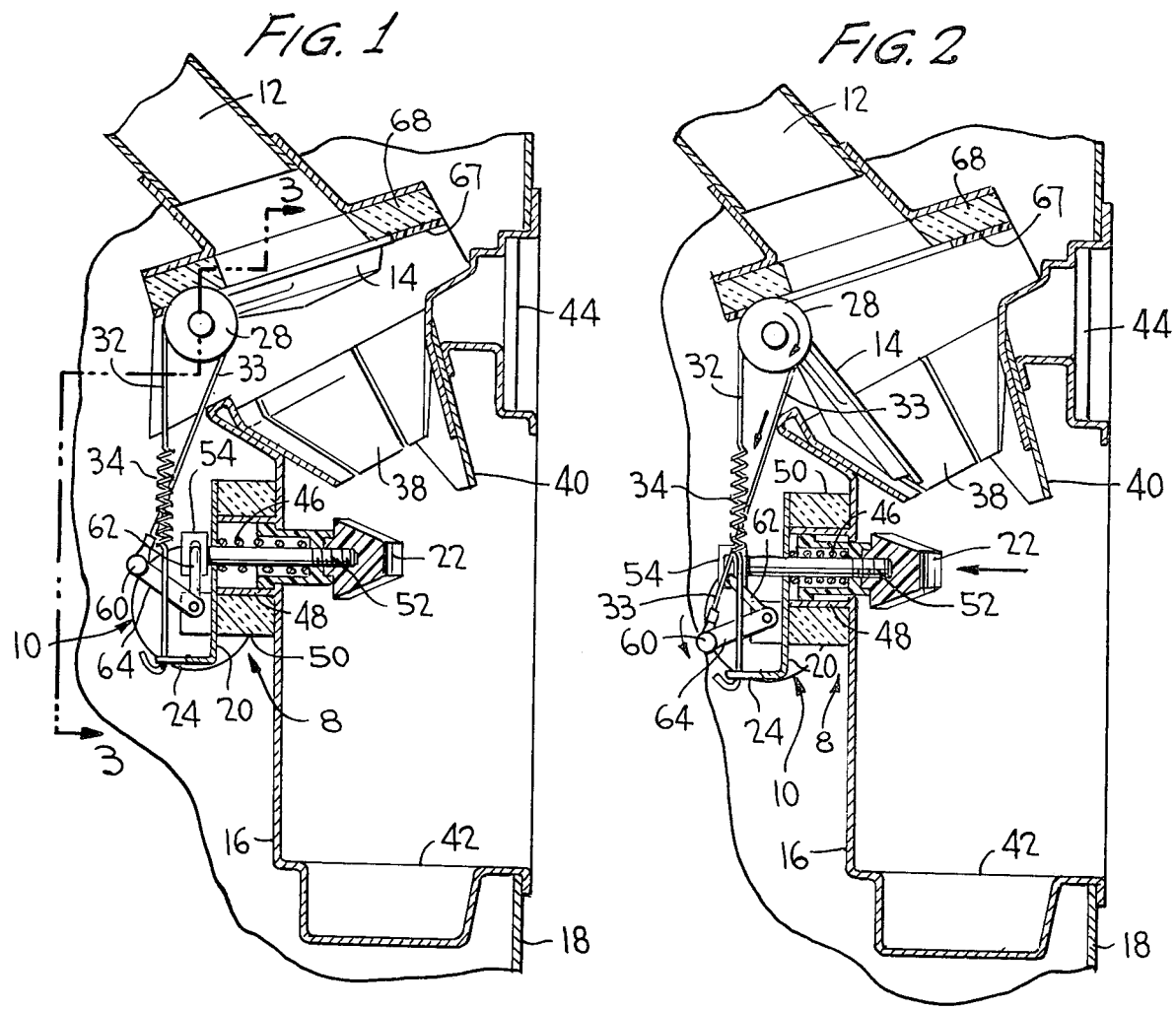
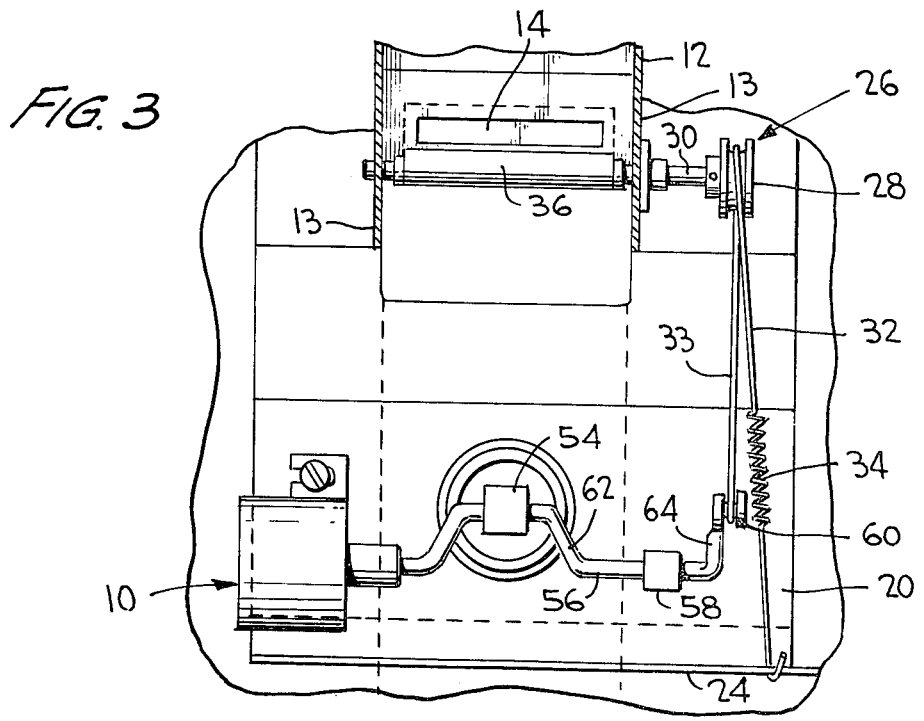

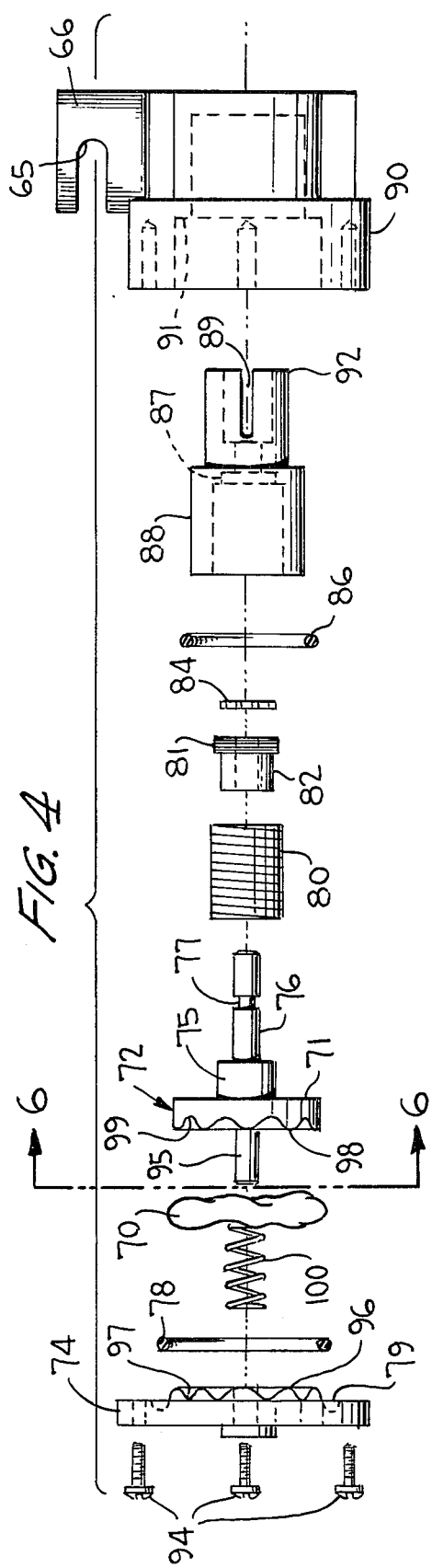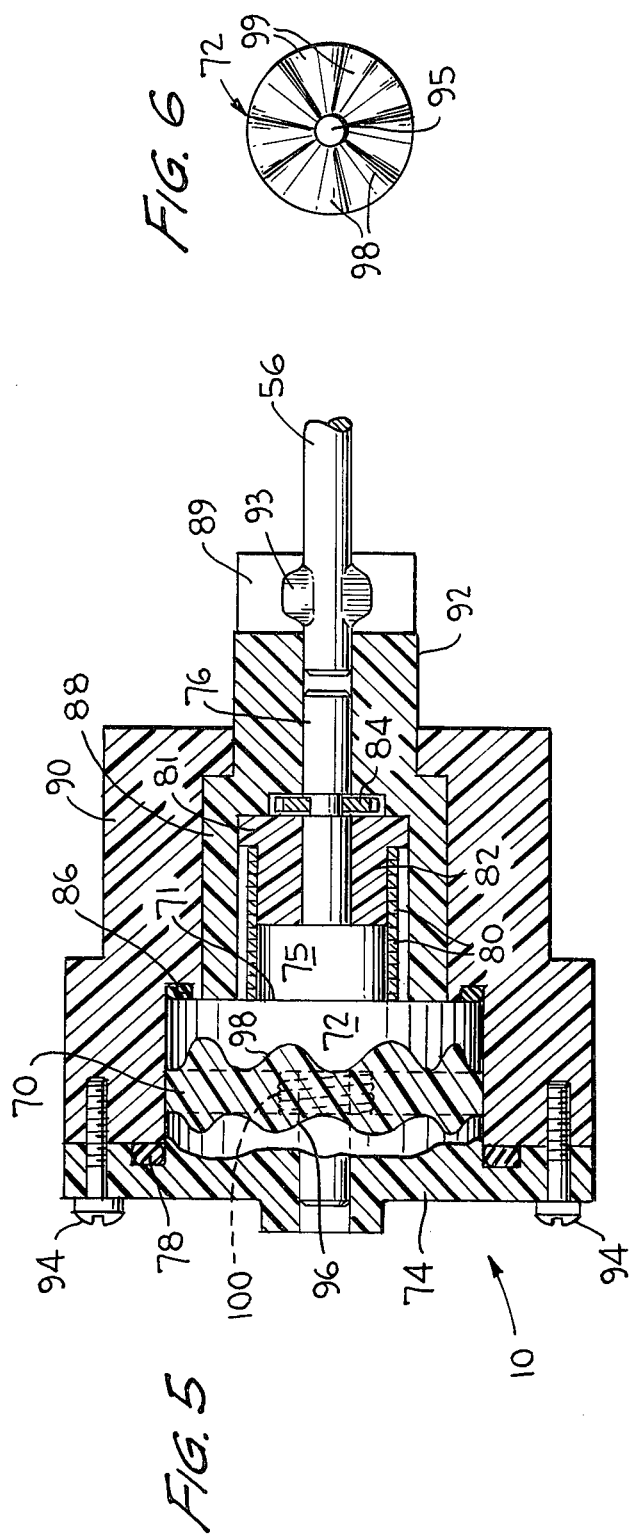

DOOR CONTROL DEVICE WITH CLOSURE REGULATOR

CROSS-REFERENCE TO RELATED APPLICATION

This is a continuation of copending application Ser. No. 644,329, filed Dec. 24, 1975, now abandon.

BACKGROUND OF THE INVENTION

1. Field of the Invention

The present invention is related to door closure devices and, more particularly, is directed towards a regulator for controlling the opening and closing movement of a duct seal door of an ice maker in a household refrigerator and which, even more particularly, slows down the closing movement thereof while allowing relatively unimpeded opening movement.

2. Description of the Prior Art

Unique door closure devices exist for particular door closure requirements. Such requirements dictate the utilization of design criteria that take into account, for example, the speed with which the door must be opened, the speed with which the door must be closed, the spring forces necessary to effectuate or control such speeds, and the like. Other design criteria take into account the environment within which the door control device is to be situated, servicing requirements, ease of installation, manufacturing expense, reliability, and the like.

A specific application of a door control device which is recognized as being one in which the device must provide rather unique operating characteristics is in the control of a duct seal door employed for opening and closing an ice passageway of an automatic ice dispenser mounted within a household refrigerator. As recognized in U.S. Pat. No. 3,548,444 to Jacobus et al, such a door must be openable by the application of a small force, and the control device should close the door to completely seal the ice passageway upon the removal of that force. One major requirement recognized by Jacobus et al is that such a device must be operable in a manner such that the door will not close before the dispensed ice pieces enter the passageway serviced by the door.

The Jacobus et al patent teaches a device which meets the foregoing design requirements by utilizing the principle of inertia. In the Jacobus et al invention, the duct seal door is linked through speed-multiplying gears to an inertia wheel. When a power spring begins to close the door upon removal of the manual force required to keep it open, the inertial wheel, which initially tends to remain at rest, begins to rotate slowly, gradually picking up speed. This motion is transmitted to the door to slow its closure rate. Although the Jacobus et al device is widely utilized and has been found to be fairly reliable, it nevertheless requires the coaction of a large number of mechanical parts which increases costs over a less complex device and is difficult to service easily.

The most pertinent prior art U.S. patents uncovered during the course of a novelty search of the present invention include the following: U.S. Pat. Nos. 3,160,911; 3,865,216; 3,460,658; 3,365,956; 3,104,861; and 3,362,510. However, none of the foregoing are believed to teach or suggest the unique structural features of the instant invention as set forth more fully hereinbelow.

OBJECTS AND SUMMARY OF THE INVENTION

It is therefore a primary object of the present invention to provide a door control device for the duct seal door of an automatic ice maker installed in a household refrigerator which is much simplified over prior designs, requires fewer moving parts, is more easily serviceable, is less expensive to manufacture, and which provides high reliability in operation.

Another object of the present invention is to provide a door control device which utilizes a closure regulator with which the closure rate of the door may be slowed while unimpairing the opening speed thereof.

An additional object of the present invention is to provide means for controlling the speed of opening and closing the duct seal door of an automatic ice dispenser whose mechanical structure and operation is far simplified over the prior art devices of this nature.

A still further object of the present invention is to provide a time delay device for a duct seal door of an ice dispenser for retarding the closure thereof in order to ensure the delivery of all ice which has entered the ice chute serviced by the door, even if the manual force required to keep open the door is removed too rapidly.

The foregoing and other objects are attained in accordance with one aspect of the present invention through the provision of apparatus for controlling the opening and closing movement of a door which comprises a door actuator assembly connected to and rotatable with the door whose movement is desired to be controlled, a spring connected to the door actuator for urging the door to rotate to its closed position, means for retarding the operation of the spring and therefore slowing the closure of the door, a linkage for connecting the retarding means to the spring, and a pushrod assembly which is responsive to manual actuation for rotating the linkage which, in turn, causes the door to rotate to its open position. The retarding means comprises means for permitting substantially unimpeded rotation of the linkage in a first direction and means for substantially slowing and impeding the opposite rotation of the linkage. Such impeding means comprises a rotor coupled to the linkage for rotation therewith in one direction. The rotor includes a first non-planar, preferably rippled, surface, and is positioned within a stator housing which may have a similar non-planar, preferably rippled, surface facing that of the rotor. Disposed between the two rippled surfaces is a viscous, retarding fluid, such as silicone gum, which impedes the rotation of the rotor since its rippled surface is in intimate contact with the fluid. A one-way spring clutch couples the rotor to the linkage when the latter is rotated in response to the closure of the door, and decouples the rotor from the linkage when the door is being opened.

In accordance with still other aspects of the present invention, the door actuator includes a pulley assembly having a shaft connected to and rotatable with the door. The spring is series connected with a belt that is friction fit about the pulley so as to be movable therewith. The spring connects one end of the belt to a rigidly secured baseplate, while the other end of the belt is connected to an extending lever of the linkage. The other end of the linkage is coupled to the rotor of the closure control device via the one-way clutch. The linkage further includes a C-shaped actuating link disposed intermediate the ends thereof. Adjacent the actuating link is positioned a pushrod actuator which rotates the linkage in response to the forced placement of a glass or other container on the opposite recessed portion of the ice dispenser.

BRIEF DESCRIPTION OF THE DRAWINGS

Various objects, features and attendant advantages of the present invention will be more fully appreciated as the same become better understood from the following detailed description of the invention when considered in connection with the accompanying drawings, in which:

FIG. 1 is a side sectional view of the ice delivery portion of an automatic ice dispensing apparatus including a door control device in accordance with a preferred embodiment of the present invention;

FIG. 2 is the same view of the apparatus illustrated in FIG. 1 but depicts the relative position of the elements thereof with the door in its open position;

FIG. 3 is another view of the apparatus illustrated in FIG. 1 and taken along line 3—3 thereof;

FIG. 4 is an exploded view illustrating the elements which comprise a preferred embodiment of the closure regulator of the door control device of the present invention;

FIG. 5 is a side sectional view illustrating the closure regulator of FIG. 4 when assembled; and FIG. 6 is a plan view of a preferred embodiment of the rotor element of the closure regulator illustrated in FIG. 4 and taken along line 6—6 thereof.

DETAILED DESCRIPTION OF THE PREFERRED EMBODIMENTS

Referring now to the drawings, wherein like reference numerals designate identical or corresponding parts throughout the several views, and more particularly to FIGS. 1 through 3 thereof, a preferred embodiment of the door control device of the present invention is indicated generally by the reference numeral 8 and is illustrated as part of an automatic ice dispenser installed in a household freezer door 18.

Positioned adjacent the outlet of an ice chute 12 is thermal insulation 68 to which is attached a plastic sealing plate 67 which is recessed to receive the duct seal door 14 when closed. Located underneath chute 12 is an ice delivery nozzle 38 which directs ice delivered from chute 12 to the glass or container positioned on a platform 42 of the recessed ice dispenser assembly 16.

Recessed assembly 16 is secured within the outer freezer door 18 of a household refrigerator to provide a convenient dispensation point for the automatic ice dispensing apparatus. Positioned adjacent ice delivery nozzle 38 is a guard lip 40, above which is located a control selector 44 which provides for enabling the user to select either ice cubes or crushed ice to be delivered.

Duct seal door 14 is coupled to a rotatable door actuator assembly indicated generally by the reference numeral 26 in FIG. 3. Door actuator assembly 26 includes a pulley 28 which is rigidly coupled to a door shaft 30. Doorshaft 30 is journaled for rotation in the side support walls 13 of ice chute 12. Duct seal door 14 is rigidly coupled to shaft 30 via a shaft coupling sleeve 36. Side support walls 13 extend from a rear mounting bracket or support plate 20 which is, in turn, rigidly secured to the recessed ice dispenser assembly 16.

Transversely extending along the lower edge of rear mounting bracket 20 is a support flange 24. A belt 32 is attached to support flange 24 at one end thereof via a door closure spring 34. Belt 32 is friction wound about pulley 28 so as to be non-slippingly rotatable therewith.

The remaining end 33 of belt 32 is wound about and secured to a pivot end 60 of a connecting arm or linkage 56.

Linkage 56 is rotatably journaled to rear mounting bracket 20 by a tubular flange 58 upwardly extending from bracket 20 and surrounding linkage 56. One end of linkage 56 is formed as a belt actuating lever 64 which terminates in the pivot end 60 to which end 33 of belt 32 is connected. The distal end of connecting linkage 56 is coupled to a closure regulator 10, the structure and operation of which will become more clear hereinafter.

Disposed intermediate the ends of linkage 56 is a C-shaped actuating link 62 having an actuation point 54 formed at the apex thereof. Actuation point 54 may either be connected to or simply disposed adjacent a pushrod 52 (FIGS. 1 and 2). The distal end of pushrod 52 has mounted thereon a concave glass-receiving pushrod actuator tip 22. Pushrod 52 is disposed within a guide channel 48 extending between the rear wall of recessed assembly 16 and the support plate 20. A return spring 46 is disposed within guide channel 48 for urging pushrod 52 to the right (as viewed in FIGS. 1 and 2). Thermal insulation 50 is preferably disposed about guide channel 48 between bracket 20 and the rear wall of assembly 16.

The operation of the apparatus set forth thus far will now be described with reference to FIGS. 1 through 3. In FIG. 1, the duct seal door 14 is illustrated in its fully closed position in which it substantially covers and seals the opening to ice chute 12. When a consumer places a glass or other container on platform 42 within recessed assembly 16 and manually forces the rear of the container against the concave pushrod actuator 22, pushrod 52 is forced rearwardly (to the left as viewed in FIG. 2) in opposition to the force exerted by return spring 46. The distal end of pushrod 52 moves actuation point 54 of link 62 of linkage 56 to the left (as viewed in FIG. 2) such that linkage 56, as a whole, pivots counterclockwise (FIGS. 1 and 2) about a pivot axis defined by journaling flange 58.

Disregarding for the moment the action of closure regulator 10, the counterclockwise rotation of linkage 56 also causes belt actuating lever 64 to rotate counterclockwise. Lever 64, in turn, exerts a downward force on end 33 of friction belt 32 which, in turn, causes pulley 28 to rotate clockwise, the action of which is illustrated by the directional arrows in FIG. 2. Rotation of pulley 28 causes, in turn, rotation of door shaft 30, shaft coupling 36, and the resultant movement of duct seal door 14 to its full open position illustrated in FIG. 2.

In the position of door 14 illustrated in FIG. 2, closure spring 34 is extended somewhat by virtue of the opposing forces exerted by belt 32 and flange 24 to which the other end of spring 34 is attached. As long as the sufficient pressure is maintained on actuator 22 of pushrod 52, duct seal door 14 will remain in the position shown in FIG. 2.

Actuation of pushrod 52 also triggers electrical apparatus (not shown) for causing an ice bucket assembly (not shown), disposed just above ice chute 12, to begin dispensing either ice cubes or crushed ice to chute 12. If perchance the operator of the ice dispenser removes his glass or container too rapidly from pushrod actuator 22, as is often the case, duct seal door 14 will quickly return, if unrestrained by the closure regulator 10 of the present invention, under the force of spring 34 to the position illustrated in FIG. 1 prior to the time necessary for all the ice in ice chute 12 to be dispensed through nozzle 38. It can be appreciated that the provision of a suitable closure regulator in the form of a speed control or time delay to counteract the force of door closure spring 34 will result in a set of door closure conditions whereby sufficient time will be provided so that all of the ice disposed within ice chute 12 may be dispensed through nozzle 38, as is necessary to prevent leakage, deterioration of parts, and the like.

Closure regulator 10 time delays the closure of duct seal door 14 by slowing the clockwise rotation of connecting linkage 56 from the position illustrated in FIG. 2 in a manner to be described more fully hereinbelow. As will become clear, regulator 10 incorporates a one-way clutch which allows connecting linkage 56 to freely rotate in its counterclockwise direction, as viewed in FIG. 2, but which impedes its clockwise rotation to provide the desired retarding or delay function of the closure of duct seal door 14.

Referring now to FIGS. 4 through 6, a preferred embodiment of the closure regulator 10 of the present invention is illustrated. Regulator 10 comprises a stator housing 90 from which extends a flange 66 having a screw-receiving slot 65 formed therein to facilitate mounting of regulator 10 to bracket 20 (see FIG. 3).

Positionable within stator housing 90 is a driver 88 having an extension shaft 92 formed at one end thereof which has longitudinally formed slots 89 which engage pinch sections 93 formed in one end of connecting linkage 56 (FIG. 5). Driver 88 thus rotates within housing 90 as linkage 56 rotates.

Positioned coaxially with linkage 56 is a similarly sized shaft 76 rigidly connected via a collar 75 to a substantially circular baseplate 71 of a rotor 72. Extending from another side of baseplate 71 and coaxial with shaft 76 is another shaft 95 which defines the axis of rotation of rotor 72.

A cylindrical tubular spool 82 is adapted to be fitted about shaft 76 of rotor 72 so as to be adjacent collar 75. Spool 82 has square shoulder 81 extending peripherally about one end thereof which fits within a mating square recess 87 of driver 88 to prevent relative rotation therebetween.

A one-way spring clutch 80 is sized to fit about the body of spool 82 and is retained adjacent baseplate 71 of rotor 72 by shoulder 81 of spool 82, as best viewed in FIG. 5. A retainer 84 fits within a locking recess 77 formed in shaft 76 to secure spool 82 and spring clutch 80 in position.

Connected to stator housing 90 by means of screws 94 is a cover 74 having ripples 96 formed along the inwardly facing surface thereof. The ripples or raised edges 96 are interleaved amongst depressions 97. Rotor 72 includes a similarly formed surface having ripples 98 and interleaved depressions 99 (see FIG. 6).

A viscous fluid such as, for example, a silicone gum or putty 70, is disposed between the opposing rippled surfaces 98 and 96 of rotor 72 and cover 74, respectively. Ring seals 78 and 86 may be provided in order to prevent leakage of putty 70 from the enclosure defined by the cylindrical side wall of stator housing 90 and the opposing rippled surfaces 96 and 98 of cover 74 and rotor 72, respectively.

A coil spring 100 is positionable about axis 95 of rotor 72 and acts as a seal assistant in urging rotor 72 rightwardly (as viewed in FIG. 5) such that its plane surface 71 is urged in a sealing relationship against the inwardly extending abutment 91 of stator housing 90.

Silicone gum 70 preferably comprises a non-Newtonian, thixotropic/dilatant material such as, for example, the material known as SE-30 produced by the Silicone Products Department of the General Electric Company in Waterford, New York. Such a material offers very little resistance to slow shear rates, and relatively high resistance to high shear rates. Accordingly, for a given force, the motion of rotor 72 through silicone gum 70 will be provided with a certain degree of regulation. That is, if rotor 72 is forced to rotate at a high speed, it would encounter a great deal of resistance from silicone gum 70; whereas at a slower rate of rotation, gum 70 would offer less resistance. Such characteristics are generally attributable to the silicone gum's entangled, long-chain molecules, which slide by one another quite freely if given enough time to do so, but which, due to their entanglement, appear more or less rigid when subjected to high pressures and/or impacts. In this respect, silicone gum 70 functions as a speed regulator as well as a time delay.

In operation, it should be appreciated that driver 88 is coupled with and rotates with linkage 56. In connection with the structural arrangement described heretofore with respect to FIGS. 1 through 3, when linkage 56 is rotated counterclockwise, driver 88 is also rotated counterclockwise as is spool 82 coupled thereto. This sense of rotation causes spring clutch 80 to "unwind" so as to allow spool 82 to freely rotate therewithin, shaft 76 of rotor 72 remaining stationary.

Rotation of linkage 56 in its clockwise direction, as occurs when duct seal door 14 is being closed under the force exerted by spring 34, causes driver 88 to rotate in its clockwise direction as does coupled spool 82. However, in this sense of rotation, one-way spring clutch 80 tightens about spool 82 which force is transmitted to shaft 76 to cause same to rotate therewith. Hence, the rippled surface of rotor 72 must overcome the drag forces presented by viscous silicone putty 70 when linkage 56 attempts to rotate clockwise to close door 14, thereby slowing the closing movement thereof as desired.

It may not be necessary to provide cover 74 with a rippled surface as illustrated, inasmuch as only one rippled surface, i.e., on rotor 72, may be necessary to provide the desired action. A central feature is that there be presented an impedance to the free flow of viscous fluid 70 along the adjacent surface of rotor 72 when the latter is actuated by the clutch 80.

Obviously, numerous modifications and variations of the present invention are possible in light of the above teachings. It is therefore to be understood that within the scope of the appended claims the invention may be practiced otherwise than as specifically described herein.

What is claimed is:

1. Apparatus for controlling opening and closing movement of an ice dispenser duct seal door, said apparatus comprising:
   means responsive to manual actuation for opening the door;
   means for biasing the door toward its closed position;
   a rotatable shaft operatively linked to the door;
   a device for substantially slowing and impeding rotational motion;
   a one-way clutch interposed between said slowing and impeding device and said shaft, said clutch decoupling said device from said shaft to permit substantially unimpeded rotation of the shaft in a door opening sense and said clutch coupling said device to said shaft to impede rotation of said shaft in a door-closing sense; and said slowing and impeding device including a rotor coupled to said one-way clutch, said rotor having a rotor non-planar surface, and a viscous fluid positioned adjacent said rotor non-planar surface for impeding the rotation of said rotor.

2. Apparatus as set forth in claim 1, wherein said rotor comprises a circular plate upon which is formed said rotor non-planar surface, a rotor shaft defines the axis of rotation of said rotor and extends transversely from said plate, and said one-way clutch comprises a spring clutch coaxially positioned about said rotor shaft.

3. Apparatus as set forth in claim 1, wherein said slowing and impeding device further comprises a stator housing which includes a stator non-planar surface that faces said rotor non-planar surface with said viscous fluid positioned therebetween, said viscous fluid being contained within an enclosed volume defined by said rotor and stator non-planar surfaces and a cylindrical inner wall formed within said stator housing.

4. Apparatus as set forth in claim 1, wherein said rotor non-planar surface comprises a plurality of spaced ripples radially extending from the central axis of said rotor.

5. Apparatus as set forth in claim 3, wherein said rotor non-planar surface comprises a plurality of spaced ripples radially extending from the central axis of said rotor.

6. Apparatus as set forth in claim 5, wherein said stator non-planar surface is formed substantially congruent to said rotor non-planar surface.

7. Apparatus for controlling the opening and closing movement of an ice dispenser duct seal door, which comprises:

a door actuator assembly connected to and rotatable with the door;

means connected to said door actuator assembly for urging the door to rotate to its closed position;

a closure regulator for retarding the operation of said means for urging the door closed;

means for connecting said closure regulator to said means for urging the door closed; and an actuating link responsive to manual actuation for rotating said connecting means and for urging said door to rotate to its open position; wherein said closure regulator comprises means for permitting substantially unimpeded rotation of said connecting means in a first sense and means for substantially slowing and impeding the rotation thereof in a second sense opposite to said first sense, and wherein said slowing and impeding means includes a rotor coupled to said connecting means for rotation therewith in said second sense, said rotor including a rotor non-planar surface, and viscous fluid means positioned adjacent said rotor non-planar surface for impeding the rotation thereof.

8. Apparatus as set forth in claim 7 wherein said unimpeded rotation permitting means comprises a one-way clutch for coupling said rotor to said connecting linkage when the latter is rotated in said second sense and for decoupling said rotor from said connecting linkage when the latter is rotated in said first sense.

9. Apparatus as set forth in claim 8, wherein said rotor comprises a circular plate upon which is formed said rotor non-planar surface, a shaft defines the axis of rotation of said rotor and extends transversely from said plate, and said one-way clutch comprises a spring clutch coaxially positioned about said shaft of said rotor.

10. Apparatus as set forth in claim 7, wherein said slowing and impeding means further comprises a stator housing which includes a stator non-planar surface that faces said rotor non-planar surface with said viscous fluid positioned therebetween, said viscous fluid being contained within an enclosed volume defined by said rotor and stator non-planar surfaces and a cylindrical inner wall formed within said stator housing.

11. Apparatus as set forth in claim 10, wherein said rotor non-planar surface comprises a plurality of spaced ripples radially extending from the central axis of said rotor.

12. Apparatus as set forth in claim 11, wherein said stator non-planar surface is formed substantially congruent to said rotor non-planar surface.

13. Apparatus as set forth in claim 7, wherein said door actuator assembly includes a pulley assembly having a shaft connected to and rotatable with the door, said means for urging the door to its closed position comprises a belt friction fit about said pulley so as to be movable therewith and a door closure spring connecting one end of said belt to ground, the other end of said belt being connected to said connecting means, and wherein said connecting means comprises a rigid linkage having one end coupled to said closure regulator, the distal end terminating in an actuating lever to which said other end of said belt is pivotally connected, and the actuating link being disposed intermediate the ends thereof.

* * * * *

UNITED STATES PATENT AND TRADEMARK OFFICE
CERTIFICATE OF CORRECTION

PATENT NO. : 4,069,545
DATED : January 24, 1978
INVENTOR(S) : KENNETH M. HOLET and LUIS E. PRADA It is certified that error appears in the above-identified patent and that said Letters Patent are hereby corrected as shown below:

Column 1, line 8, change "abandon" to -- abandoned --.

Column 3, line 54, delete "Duct seal door 14 is coupled to" and substitute therefor
-- The door control device 8 of the present invention includes a means responsive to manual actuation for opening the door 14. In the particular embodiment illustrated, this means includes --.

Column 3, line 65, delete "A" and substitute therefor -- In the illustrated embodiment, the means responsive to manual actuation for opening the door 14 further includes an actuating link 62, a connecting arm or linkage 56, and a belt 32. The --.

Column 3, line 67, after "spring 34" insert -- , which spring 34 serves as a means for biasing the door 14 towards its closed position --.

Column 4, line 2, delete "a" (second occurrence) and substitute therefor -- the --.

Column 4, line 12, delete "a" and substitute therefor -- the --.

Column 5, line 18, after "door 14." insert -- By means of the linkage arrangement, rotation in the counterclockwise direction becomes rotation in a first, or door-opening, sense; and rotation in the clockwise direction becomes rotation in a second, or door-closing, sense. --.

Column 5, line 26, delete "an" and substitute therefor -- a rotatable --

Column 5, line 30, after "rotates." insert -- By means of the linkage 56, a belt actuating lever 64, the belt 32, and the door actuator assembly 26, the rotatable shaft 92 is thus operatively linked to the door. --

UNITED STATES PATENT AND TRADEMARK OFFICE
CERTIFICATE OF CORRECTION

PATENT NO. : 4,069,545

DATED : January 24, 1978

INVENTOR(S) : KENNETH M. HOLET and LUIS E. PRADA

It is certified that error appears in the above-identified patent and that said Letters Patent are hereby corrected as shown below:

Column 5, line 44, after "spool 82" insert -- and about the collar 75, --.

Column 6, line 28, after "therewithin," insert -- the collar 75 and the --.

Column 7, line 1 (Claim 1), insert a hyphen in -- door-opening --.

Signed and Sealed this

Twenty-third Day of May 1978

[SEAL]

Attest:

RUTH C. MASON
Attesting Officer

LUTRELLE F. PARKER
Acting Commissioner of Patents and Trademarks